US009497499B2

(12) United States Patent
Chang et al.

(10) Patent No.: US 9,497,499 B2
(45) Date of Patent: Nov. 15, 2016

(54) DISPLAY APPARATUS AND METHOD FOR REMOTELY OUTPUTTING AUDIO

(75) Inventors: Woo-yong Chang, Yongin-si (KR); Seung-dong Yu, Osan-si (KR); Se-jun Park, Yongin-si (KR); Min-jeong Moon, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 861 days.

(21) Appl. No.: 12/946,428

(22) Filed: Nov. 15, 2010

(65) Prior Publication Data

US 2011/0115988 A1 May 19, 2011

(30) Foreign Application Priority Data

Nov. 13, 2009 (KR) .......................... 10-2009-0109500
Oct. 27, 2010 (KR) .......................... 10-2010-0105358

(51) Int. Cl.
| G06F 17/20 | (2006.01) |
| H04N 21/41 | (2011.01) |
| H04N 7/52 | (2011.01) |
| H04N 21/434 | (2011.01) |
| H04N 21/439 | (2011.01) |
| H04N 21/485 | (2011.01) |
| G10L 19/00 | (2013.01) |
| G10L 21/00 | (2013.01) |

(Continued)

(52) U.S. Cl.
CPC ........... *H04N 21/4126* (2013.01); *G10L 19/00* (2013.01); *H04N 7/52* (2013.01); *H04N 21/4341* (2013.01); *H04N 21/4396* (2013.01); *H04N 21/4856* (2013.01)

(58) Field of Classification Search
USPC ............ 704/8, 503, 275, 260; 348/738, 515, 348/552, 468, 14.02; 715/781, 203; 381/105, 56, 119; 725/89, 87, 68; 386/241, 296, 238, 250; 707/772; 455/3.06, 556.1; 358/465; 353/122; 700/94; 340/539.1, 15; 370/331
See application file for complete search history.

(56) References Cited

U.S. PATENT DOCUMENTS 5,543,851 A * 8/1996 Chang ........................... 348/468
6,041,657 A * 3/2000 Sutherland ............... G01H 3/06
381/56

(Continued)

FOREIGN PATENT DOCUMENTS

| KR | 1019980013296 | 4/1998 |
| KR | 1020000040660 | 7/2000 |

(Continued)

OTHER PUBLICATIONS

Zeadally, S., and A. Kumar. "Protocol support for audio streaming between bluetooth devices." Radio and Wireless Conference, IEEE, 2004.*

(Continued)

*Primary Examiner* — Pierre-Louis Desir
*Assistant Examiner* — Neeraj Sharma
(74) *Attorney, Agent, or Firm* — The Farrell Law Firm, P.C.

(57) ABSTRACT

A method for remotely outputting audio in a display apparatus includes outputting Audio/Visual (AV) data, if a command to remotely output audio is input while the AV data is being output, stopping outputting audio of the AV data while outputting video of the AV data, and transmitting at least one of compressed audio data separated from the AV data and information regarding a time when transmission of the compressed audio data starts to an external apparatus.

20 Claims, 8 Drawing Sheets

(51) Int. Cl.

| | | |
|---|---|---|
| G10L 13/00 | (2006.01) | |
| H04R 29/00 | (2006.01) | |
| H03G 3/00 | (2006.01) | |
| H04B 1/00 | (2006.01) | |
| H04N 7/14 | (2006.01) | |
| H04N 7/00 | (2011.01) | |
| H04N 5/60 | (2006.01) | |
| H04N 9/475 | (2006.01) | |

(56) References Cited

U.S. PATENT DOCUMENTS

| | | | | |
|---|---|---|---|---|
| 6,775,467 | B1* | 8/2004 | Su | 386/241 |
| 7,084,756 | B2* | 8/2006 | Stilp | G06K 7/0008 |
| | | | | 340/539.1 |
| 7,542,814 | B2* | 6/2009 | Barr | G11B 27/036 |
| | | | | 381/119 |
| 7,657,829 | B2* | 2/2010 | Panabaker et al. | 715/203 |
| 8,593,573 | B2* | 11/2013 | Price et al. | 348/552 |
| 9,247,175 | B2* | 1/2016 | Bennett | G06F 3/00 |
| 2002/0067428 | A1* | 6/2002 | Thomsen | H04N 5/445 |
| | | | | 348/465 |
| 2003/0185541 | A1* | 10/2003 | Green | H04N 5/76 |
| | | | | 386/250 |
| 2003/0229900 | A1* | 12/2003 | Reisman | G06F 17/30873 |
| | | | | 725/87 |
| 2005/0159833 | A1* | 7/2005 | Giaimo | A63F 13/12 |
| | | | | 700/94 |
| 2005/0273826 | A1* | 12/2005 | Sakane | 725/89 |
| 2006/0009245 | A1 | 1/2006 | Hur et al. | |
| 2006/0286975 | A1* | 12/2006 | Sugitani | H04M 1/0291 |
| | | | | 455/426.1 |
| 2007/0003230 | A1* | 1/2007 | Cho | H04N 5/44 |
| | | | | 386/238 |
| 2007/0083377 | A1* | 4/2007 | Trautmann et al. | 704/503 |
| 2007/0087686 | A1* | 4/2007 | Holm et al. | 455/3.06 |
| 2007/0153762 | A1 | 7/2007 | Park et al. | |
| 2007/0254695 | A1* | 11/2007 | Langberg et al. | 455/556.1 |
| 2008/0091434 | A1* | 4/2008 | Rodriguez et al. | 704/275 |
| 2008/0212041 | A1* | 9/2008 | Koizumi | G06F 3/1423 |
| | | | | 353/122 |
| 2009/0091655 | A1* | 4/2009 | Russell et al. | 348/515 |
| 2009/0136060 | A1* | 5/2009 | Mishima | 381/105 |
| 2009/0158198 | A1* | 6/2009 | Hayter et al. | 715/781 |
| 2009/0216745 | A1 | 8/2009 | Allard | |
| 2009/0284577 | A1* | 11/2009 | Kumar | H04N 7/147 |
| | | | | 348/14.02 |
| 2010/0053471 | A1* | 3/2010 | Shikata et al. | 348/738 |
| 2010/0131990 | A1* | 5/2010 | Ruhnke | H04N 7/162 |
| | | | | 725/68 |
| 2011/0035223 | A1* | 2/2011 | Schiller | G06F 17/30749 |
| | | | | 704/260 |
| 2011/0085781 | A1* | 4/2011 | Olson | 386/296 |
| 2011/0252062 | A1* | 10/2011 | Hanatani et al. | 707/772 |
| 2012/0020325 | A1* | 1/2012 | Swamy | H04W 36/14 |
| | | | | 370/331 |

FOREIGN PATENT DOCUMENTS

| | | |
|---|---|---|
| KR | 1020060005241 | 1/2006 |
| KR | 100784050 | 12/2007 |
| KR | 1020080106758 | 12/2008 |
| KR | 1020090074633 | 7/2009 |

OTHER PUBLICATIONS

European Search Report dated Feb. 20, 2015 issued in counterpart application No. 10830189.6-1902.

European Search Report dated Mar. 18, 2016 issued in counterpart application No. 10830189.6-1908, 3 pages.

* cited by examiner

DISPLAY APPARATUS AND METHOD FOR REMOTELY OUTPUTTING AUDIO

PRIORITY

This application claims priority under 35 U.S.C. §119(a) to Korean Patent Application No. 2009-0109500, filed in the Korean Intellectual Property Office on Nov. 13, 2009 and Korean Patent Application No. 2010-0105358, filed in the Korean Intellectual Property Office on Oct. 27, 2010, the disclosure of which is incorporated herein by reference.

BACKGROUND OF THE INVENTION

1. Field of the Invention

The present invention relates generally to a display apparatus and method for remotely outputting audio, and more particularly, to a display apparatus which allows audio which is supposed to be output in a digital apparatus to be output in another remotely located digital apparatus, a method for remotely outputting audio thereof, a mobile apparatus, and a method for outputting audio thereof.

2. Description of the Related Art

Recently, as various digital apparatuses are introduced, the number of digital apparatus possessed by a user has increased. Therefore, it is no exaggeration to say that the user is literally surrounded by numerous digital apparatuses.

Those digital apparatuses have contributed to making the user's life more enriched and convenient. These days, as a digital apparatus becomes more sophisticated and multi-functional in a relatively short period of time, its contribution to the user's life has greatly increased.

However, the user only focuses on making a digital apparatus more sophisticated and multi-functional in his or her pursuit to realizing more convenient and enriched way of life.

Yet, there is a limit to the function performed by a single digital apparatus. Therefore, a method for making the user's life more convenient and enriched by converging the digital apparatuses owned by the user to create new function which cannot be performed by a single digital apparatus is required.

SUMMARY OF THE INVENTION

The present invention has been made to address at least the above problems and/or disadvantages and to provide at least the advantages described below.

Accordingly, an aspect of the present invention is to provide a display apparatus which allows audio which is supposed to be output in a certain digital apparatus to be output in another remotely located digital apparatus, a method for remotely outputting audio thereof, a mobile apparatus, and a method for outputting audio thereof.

In accordance with an aspect of the present invention, a method for remotely outputting audio in a display apparatus includes outputting Audio/Video (AV) data, if a command to remotely output audio is input while the AV data is being output, stopping outputting audio of the AV data while outputting video of the AV data, and transmitting at least one of compressed audio data separated from the AV data and information regarding a time when transmission of the compressed audio data starts to an external apparatus.

A method for outputting audio in a mobile apparatus, according to an exemplary embodiment, includes receiving compressed audio data from an external apparatus, decompressing received compressed audio data by decoding the audio data, and outputting decompressed audio data.

A display apparatus, according to an exemplary embodiment, includes a communication unit which communicates with an external apparatus, an output unit which outputs AV data, a switching unit which, if a command to remotely output audio is input while the AV data is output, stops outputting audio of the AV data while keeps outputting video of the AV data, and a controller which controls the switching unit to transmit at least one of compressed audio data separated from the AV data and information regarding a time when transmission of the compressed audio data starts to an external apparatus through the communication unit.

According to another aspect of the present invention a mobile apparatus includes a network communication unit which receives one of compressed audio data and information regarding a time when transmission of the compressed audio data starts, a controller which decompresses received compressed audio data by decoding the audio data, and an output unit which outputs decompressed audio data.

Audio which is supposed to be output in a certain digital apparatus may be output in another remotely located digital apparatus. Accordingly, a user may be provided with video and audio from different digital apparatuses separately.

In addition, according to an embodiment, content irrelevant to audio may be provided through a display while audio which is supposed to be output in another digital apparatus is being output. Accordingly, a user may be provided with various content through a single digital apparatus simultaneously and enjoy them.

BRIEF DESCRIPTION OF THE DRAWINGS

The above and/or other aspects of the present disclosure will be more apparent by describing the present disclosure with reference to the accompanying drawings, in which.

DETAILED DESCRIPTION OF EMBODIMENTS OF THE PRESENT INVENTION

Various embodiments of the present invention are described in detail below with reference to the accompanying drawings.

In the description, like drawing reference numerals are used for the like elements, even in different drawings. The matters defined in the description, such as detailed construction and elements, are provided to assist in a comprehensive understanding of embodiments. However, embodiments can be practiced without those specifically defined matters. Also, well-known functions or constructions that are commonly known are not described in detail since they would obscure the application with unnecessary detail.

For better description and understanding, AV content is defined as content including both video data and audio data or content including not only video data and audio data but also caption data, video content is defined as content including only video data, and audio content is defined as content including only audio data. In addition, AV content may be AV data, audio data may be an audio signal, and video data may be a video signal.

The operation of remotely outputting audio is performed by an audio remote output system which is consisted of a DTV 100 and a mobile phone 200. In an audio remote output system, the DTV 100 serves as an apparatus which separates/transmits audio from AV content, and the mobile phone serves as an apparatus which receives/output the separated/transmitted audio.

Hereinafter, the process of remotely outputting audio in an audio remote output system which is consisted of the DTV 100 and the mobile phone 200 will be explained with reference to FIG. 1.

Figure 1:
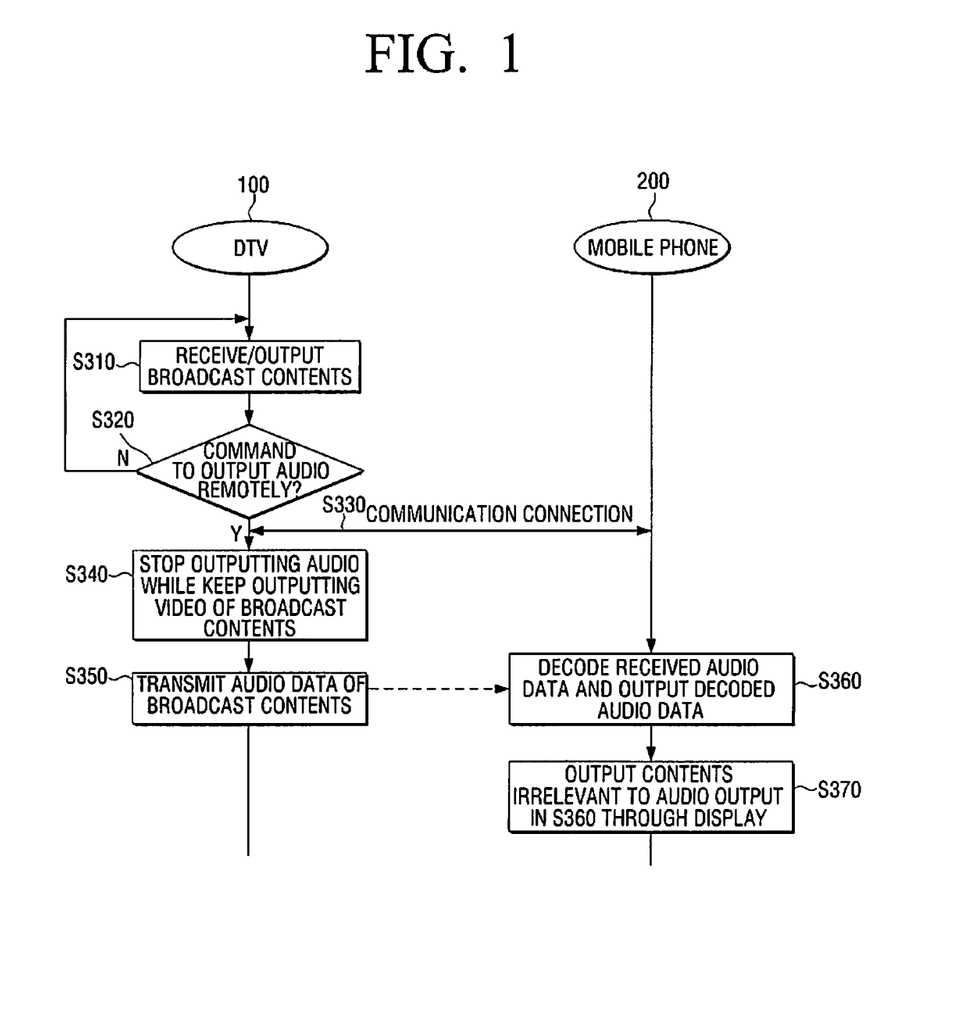
FIG. 1 is a diagram illustrating a method for remotely outputting audio according to an embodiment.

FIG. 1 is a diagram illustrating a method for remotely outputting audio according to an embodiment. In FIG. 1, the operations performed by the DTV 100 are illustrated in the left side and the operations performed by the mobile phone 200 are illustrated in the right side.

As illustrated in FIG. 1, if a command to remotely output audio is input from a user in step S320 while broadcast content is being received and output in step S310, the DTV 100 sets communication connection with the mobile phone 200 in step S330. Since the broadcast content include both video data and audio data, the broadcast content may be regarded as AV data.

Subsequently, the DTV 100 stops outputting audio, but keeps outputting video of the broadcast content in step S340. Accordingly, a broadcast image is output but broadcast audio is not output in the DTV 100.

The DTV 100 transmits audio data separated from received broadcast content to the mobile phone 200 in step S350. In this case, the audio data transmitted to the mobile phone 200 from the DTV 100 is data which is separated from the broadcast content but is not decoded. Therefore, the audio data transmitted in step S350 is compressed audio data.

Meanwhile, the mobile phone 200 receives audio data which is transmitted from the DTV 100 in step S350, decodes (decompresses) the received audio data, and outputs the decoded audio data in step S360. The mobile phone 200 may output content which are irrelevant to the audio data output in step S360 through a display while the audio is being output in step S360 in step S370.

The content output in step S370 are content which are not audio content and may be AV content, video content or text content.

When AV content is output in step S370, it is desirable to output only video without audio so as not to interfere with the audio of broadcast content which is output in step S360.

The content output in step S370 may be one of video content, text content, and video content separated from AV content. Herein, video content and video content separated from AV content may be video content corresponding to audio data. For example, the content may be content stored in the mobile phone 200 or content received from other external apparatuses. Herein, the external apparatuses include the DTV 100.

For example, it is possible to receive the video of broadcast content which is provided by other channel (for example, a second channel) than a channel (for example, a first channel) providing broadcast content in step S310 from the DTV 100 and output the video. In this case, however, the DTV 100 should have two tuners.

The video data of broadcast content which is provided by other channel and received from the DTV 100 is video data which is not decoded after being separated from the broadcast content. Therefore, in order to output the video data through a display, the video data should be decoded (decompressed) before being output.

Hereinafter, the process of remotely outputting audio and caption data in an audio remote output system which is consisted of the DTV 100 and the mobile phone will be explained in detail with reference to FIG. 2. Herein, the caption refers to texts describing content of audio data and may be obtained from AV data.

Figure 2:
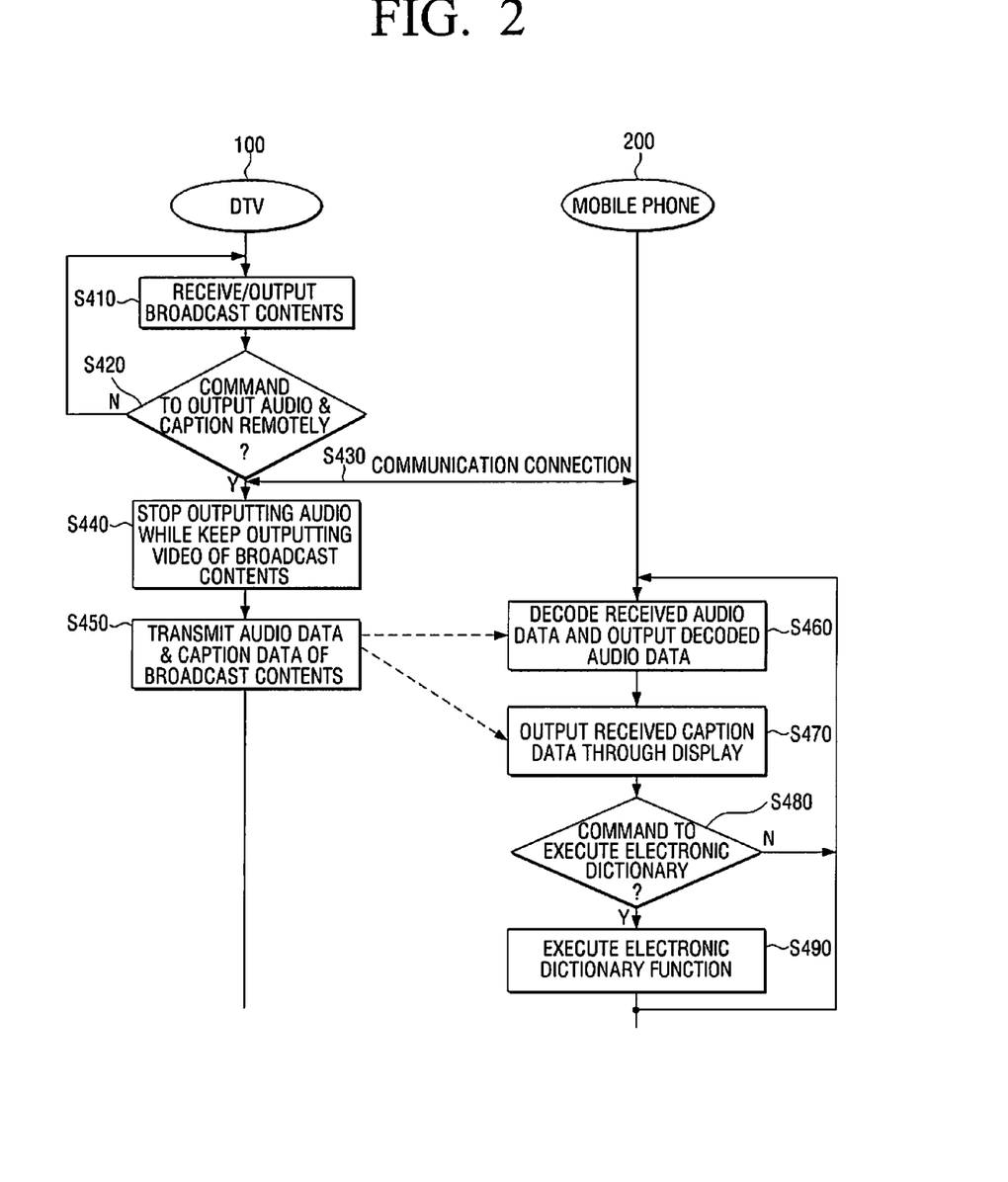
FIG. 2 is a diagram illustrating a method for remotely outputting audio and caption according to another embodiment.

FIG. 2 is a diagram illustrating a method for remotely outputting audio and caption according to another embodiment. Just like in FIG. 1, the operations performed by the DTV 100 are illustrated in the left side and the operations performed by the mobile phone 200 are illustrated in the right side in FIG. 2.

As illustrated in FIG. 2, if a command to remotely output audio and caption data is input from a user in step S420 while broadcast content is being received and output in step S410, the DTV 100 sets communication connection with the mobile phone 200 in step S430.

Subsequently, the DTV 100 stops outputting audio, but keeps outputting video of the broadcast content in step S440. Accordingly, a broadcast image is output but broadcast audio is not output in the DTV 100. Meanwhile, the DTV 100 may or may not output caption data of broadcast content depending on a user's setting.

The DTV 100 transmits audio data and caption data separated from the broadcast content to the mobile phone 200 in step S450. In this case, the audio data transmitted to the mobile phone 200 from the DTV 100 is data which is not decoded after being separated from the broadcast content. Therefore, the audio data transmitted in step S450 is compressed audio data.

The mobile phone 200 receives audio data transmitted from the DTV 100 in step S450, decodes (decompresses) the received audio data, and outputs the decoded audio data in step S460. In addition, the mobile phone 200 outputs caption data transmitted from the DTV 100 in step 450 through a display in step S470.

Thereafter, when a command to execute an electronic dictionary is input from a user in step S480, the mobile phone 200 executes electronic dictionary function in step S490. Accordingly, the user may look up the meaning of words in the caption output through a display in step S470 using the electronic dictionary provided in step S490.

Hereinafter, the process of remotely outputting multiple audio in a multiple audio remote output system which is consisted of the DTV 100 and the mobile phone 200 will be explained in detail with reference to FIG. 3.

Figure 3:
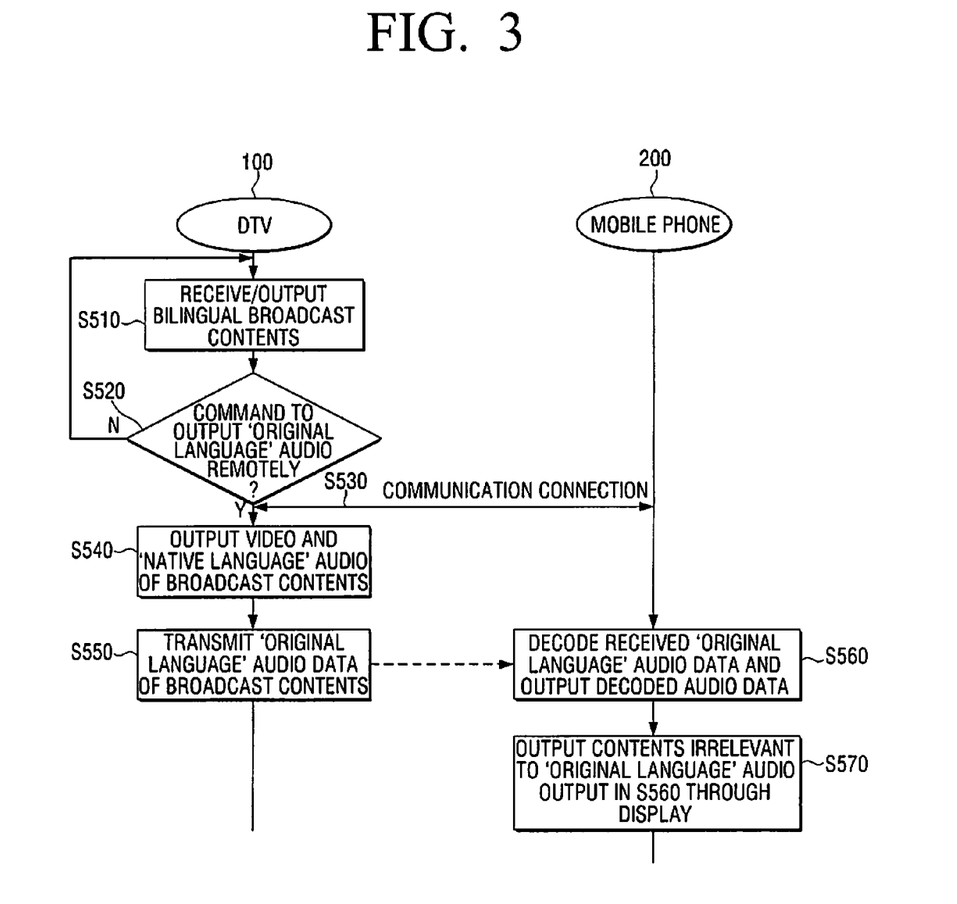
FIG. 3 is a diagram illustrating a method for remotely outputting multiple audio according to another embodiment.

FIG. 3 is a diagram illustrating a method for remotely outputting multiple audio according to another embodiment. Just like in FIGS. 1 and 2, the operations performed by the DTV 100 are illustrated in the left side and the operations performed by the mobile phone 200 are illustrated in the right side in FIG. 3.

As illustrated in FIG. 3, if a command to remotely output 'an original language' audio is input from a user in step S520 while bilingual broadcast content is being received and output in step S510, the DTV 100 sets communication connection with the mobile phone 200 in step S530.

Subsequently, the DTV 100 outputs video and 'a native language' audio of the broadcast content in step S540, and transmits 'the original language' audio data separated from the received bilingual broadcast content to the mobile phone 200 in step S550. In this case, 'the original language' audio data transmitted to the mobile phone 200 from the DTV 100 is data which is not decoded after being separated from the broadcast content. Therefore, 'the original language' audio data transmitted in step S550 is compressed audio data.

The mobile phone 200 receives 'the original language' audio data transmitted from the DTV 100 in step S550, decodes (decompresses) the received audio data, and outputs the decoded audio data in step S560.

The mobile phone 200 may output content which is irrelevant to the audio data output in step S560 through a display while 'the original language' audio is being output in step S560 in step S570.

Since operations in step S570 can be inferred from operation in step S370 of FIG. 1, detailed description regarding step S570 will not be provided.

In this embodiment, 'the original language' audio is output from the mobile phone 200, but this is only an example. 'The native language' audio, instead of 'the original language' audio, may be configured to be output from the mobile phone 200.

Figure 7A:
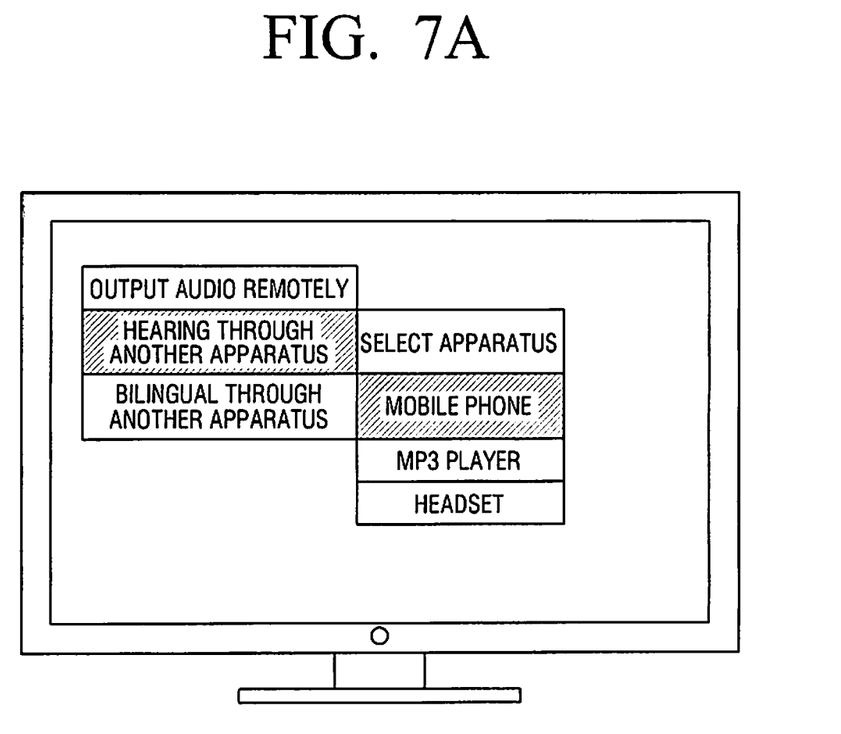
FIGS. 7A and 7B are diagrams illustrating an example of a Graphical User Interface (GUI) for selecting a digital apparatus through which audio is output.
Figure 7B:
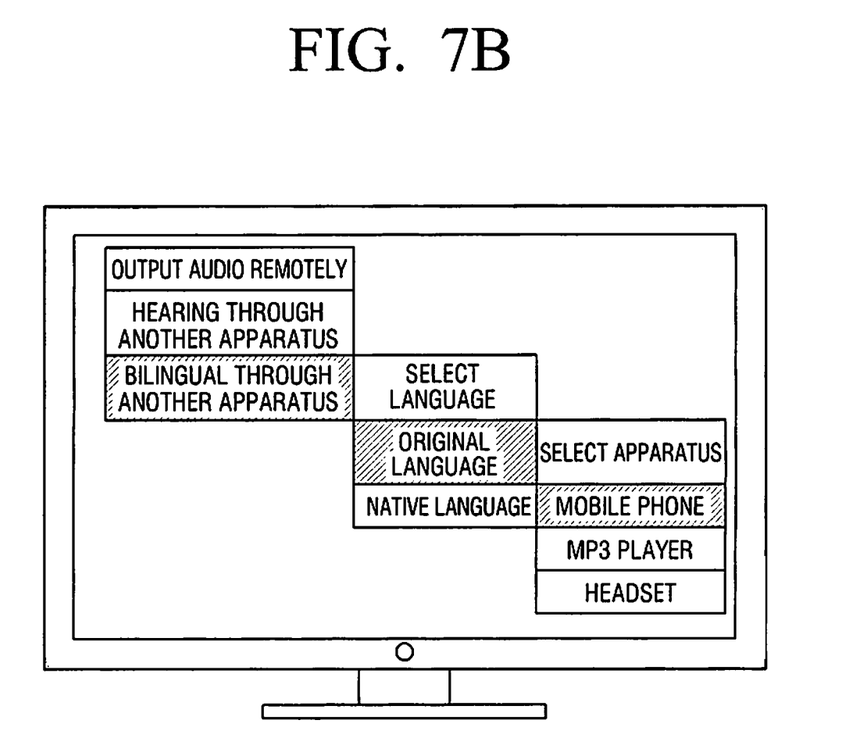

In this case, a language to be output from the mobile phone 200 may be selected by a user. The GUI for selecting a language of audio to be output is illustrated in FIG. 7B.

Hereinafter, the process of remotely outputting multiple broadcast audio and caption data in a multiple audio remote output system which is consisted of the DTV 100 and the mobile phone 200 will be explained in detail with reference to FIG. 4.

Figure 4:
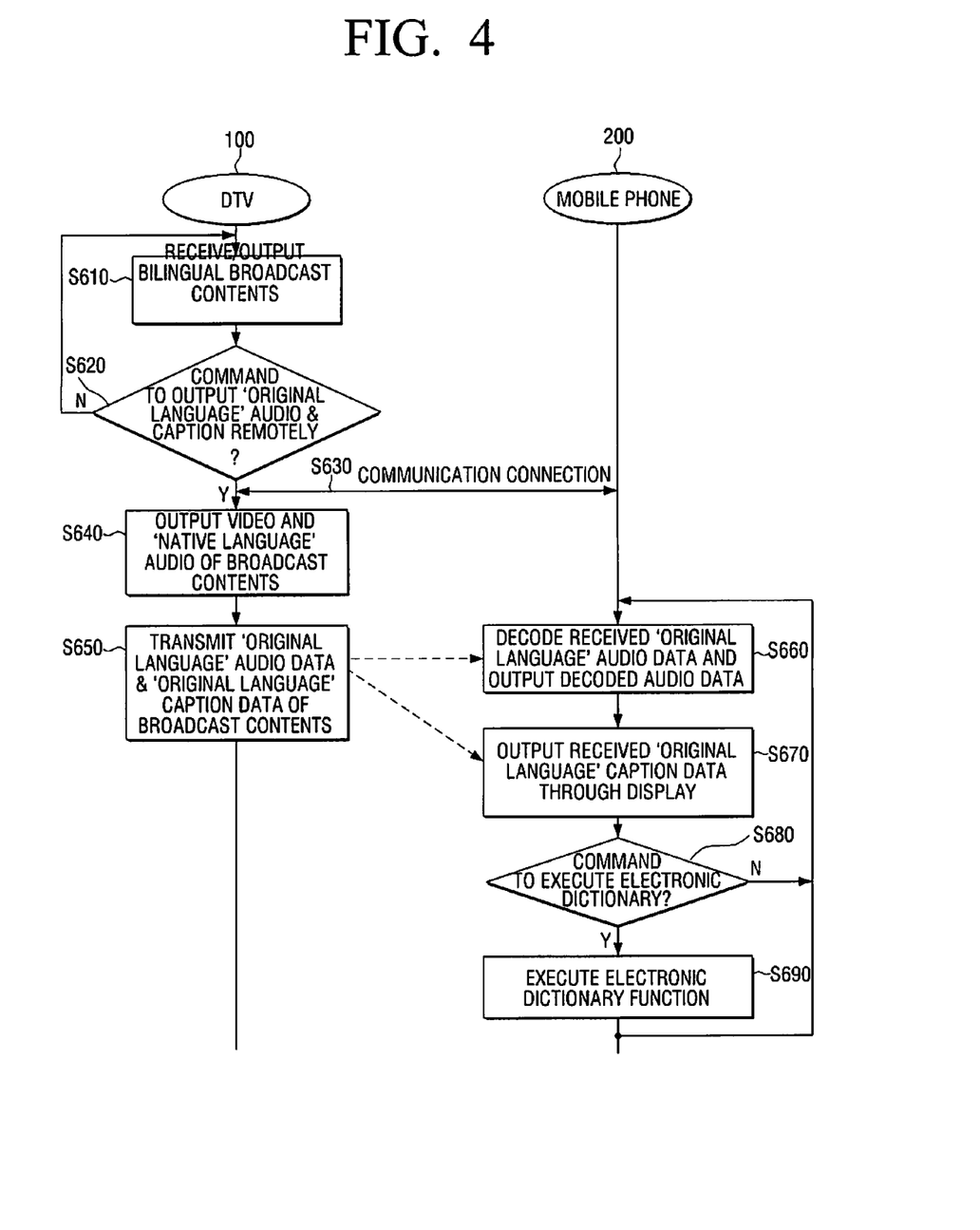
FIG. 4 is a diagram illustrating a method for remotely outputting multiple audio and caption according to another embodiment.

FIG. 4 is a diagram illustrating a method for remotely outputting multiple audio and caption according to another embodiment. Just like in FIGS. 1 to 3, the operations performed by the DTV 100 are illustrated in the left side and the operations performed by the mobile phone 200 are illustrated in the right side in FIG. 4.

As illustrated in FIG. 4, if a command to remotely output 'an original language' audio and caption data is input from a user in step S620 while bilingual broadcast content is being received and output in step S610, the DTV 100 sets communication connection with the mobile phone 200 in step S630.

Subsequently, the DTV 100 outputs video and 'a native language' audio of the broadcast content in step S640.

In addition, the DTV 100 transmits 'the original language' audio data and 'the original language' caption data separated from the received bilingual broadcast content to the mobile phone 200 in step S650. In this case, 'the original language' audio data transmitted to the mobile phone 200 from the DTV 100 is data which is not decoded after being separated from the broadcast content. Therefore, 'the original language' audio data transmitted in step S650 is compressed audio data.

The mobile phone 200 receives 'the original language' audio data transmitted from the DTV 100 in step S650, decodes (decompresses) the received audio data, and outputs the decoded audio data in step S660. In addition, the mobile phone 200 receives "the original language" caption data transmitted from the DTV 100 in step S650 and outputs the received 'the original language' caption data through a display in step S670.

Thereafter, when a command to execute an electronic dictionary is input from a user in step S680, the mobile phone 200 executes electronic dictionary function in step S690. Accordingly, the user may look up the meaning of words in 'the original language' caption output through a display in step S670 using the electronic dictionary provided in step S690.

In the embodiment, 'the original language' audio and caption is output from the mobile phone 200, but this is only an example. 'The native language' audio and caption, instead of 'the original language' audio and caption, may be configured to be output from the mobile phone 200.

Figure 5:
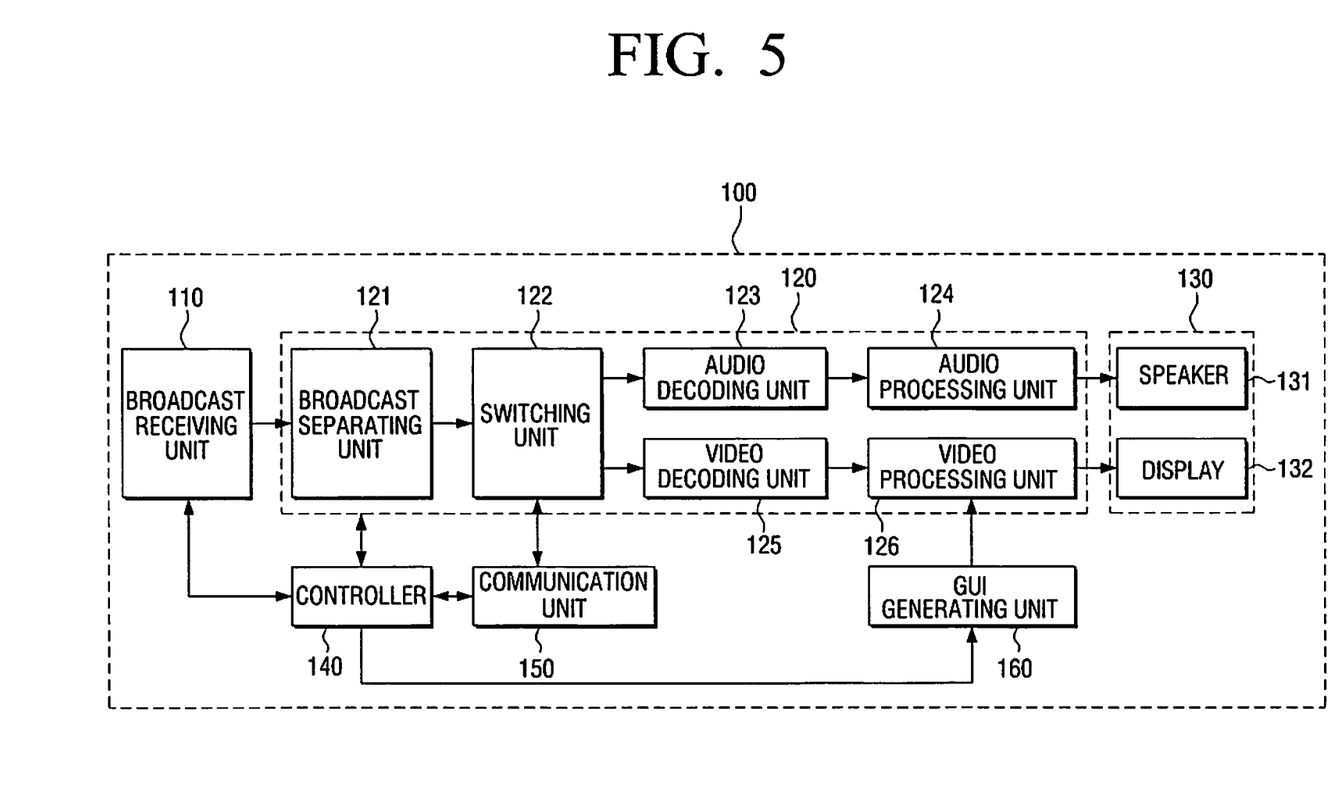
FIG. 5 is a detailed block diagram of a DTV constituting an audio remote output system.

FIG. 5 is a block diagram of the DTV 100 according to an embodiment. As illustrated in FIG. 5, the DTV 100 comprises a broadcast receiving unit 110, a broadcasting processing unit 120, a broadcast output unit 130, a controller 140, a communication unit 150, and a GUI generating unit 160.

The broadcast receiving unit 110 selects and demodulates one of broadcasts which are received over a wired or wireless link via air or cable.

The broadcast processing unit 120 processes a broadcast signal output from the broadcast receiving unit 110. The broadcast processing unit 120 comprises a broadcast separating unit 121, a switching unit 122, an audio decoding unit 123, an audio processing unit 124, a video decoding unit 125, and a video processing unit 126.

The broadcast separating unit 121 separates a broadcast signal output from the broadcast receiving unit 110 into an audio signal, a video signal and additional data.

The additional data separated from the broadcast signal is applied to the controller 140, and the additional data may include Program and System Information Protocol (PSIP) information and caption data.

The switching unit 122 performs a switching operation so that the audio signal separated from the broadcast separating unit 121 may be transmitted to the audio decoding unit 123 and/or the communication unit 150. In addition, the switching unit 122 performs a switching operation so that the video signal separated from the broadcast separating unit 121 may be transmitted to the video decoding unit 125 and/or the communication unit 150. The switching operation of the switching unit 122 is controlled by the controller 140 which will be explained later.

The audio decoding unit 123 decodes the audio signal transmitted from the switching unit 122. Accordingly, the audio decoding unit 123 outputs the decompressed audio signal.

The audio processing unit 124 converts the decoded audio signal output from the audio decoding unit 123 into an audio signal in the format which can be output through a speaker 131 formed in the DTV 100.

The video decoding unit 125 decodes the video signal transmitted from the switching unit 122. Accordingly, the video decoding unit 125 outputs the decompressed video signal.

The video processing unit 126 converts the decoded video signal output from the video decoding unit 125 into a video signal in the format which can be output through a display of the DTV 100. To do so, the video processing unit 126 performs color signal processing, scaling, and so forth on the decoded video signal.

The GUI generating unit 160 generates a GUI to be displayed under the control of the controller 140. In particular, the GUI generating unit 160 generates GUIs for inputting a command to remotely output audio, selecting multiple languages, and inputting apparatuses to remotely output audio, and generates a GUI where caption data is displayed.

The GUIs generated by the GUI generating unit 160 are applied to the video processing unit 126 and added to the videos to be displayed on a display.

The output unit 130 outputs video and audio corresponding to the video signal and the audio signal output from the broadcast processing unit 120 respectively and provides them to a user. The output unit 130 comprises the speaker 131 and the display 132.

The speaker 131 outputs an audio signal transmitted from the audio processing unit 124, and the display 132 outputs a video signal transmitted from the video processing unit 126.

The communication unit 150 is communicably connected to an external apparatus such as the mobile phone 200 and an external network. In particular, the communication unit 150 transmits at least one of audio data and video data transmitted from the switching unit 122 to the mobile phone 200. In addition, the communication unit 150 transmits information regarding a time when transmission of audio data starts to the mobile phone 200, and receives information regarding a time when decoding of audio data is completed from the mobile phone 200.

The controller 140 controls overall operation of the DTV 100 according to a user command. Specifically, the controller 140 controls the switching operation of the switching unit 122 according to a user command.

That is, if a command to remotely output audio is input from a user, the controller 140 controls the switching operation of the switching unit 122 so that an audio signal separated by the broadcast separating unit 122 is transmitted to the mobile phone 200 through the communication unit 150.

Accordingly, the audio signal separated by the broadcast separating unit 121 is transmitted to an external apparatus, that is, the mobile phone 200, and the speaker 131 of the output unit 130 stops outputting the audio signal according to the control of the controller 140.

On the other hand, if a command to remotely output audio remotely is not input from a user, the controller 140 controls the switching operation of the switching unit 122 so that the audio signal separated by the broadcast separating unit 121 is transmitted to the audio decoding unit 125. Accordingly, the speaker 131 of the output unit 130 may output the audio signal.

In addition, the controller 140 delays outputting the video of AV data considering information regarding a time when transmission of compressed audio data starts and information regarding a time when decoding is completed, the information received from the mobile phone 200.

Furthermore, the controller 140 controls the GUI generating unit 160 to add caption data applied from the broadcast separating unit 121 to videos to be displayed through the display 132. Alternatively, the controller 140 controls the communication unit 150 to transmit caption data to the mobile phone 200.

Meanwhile, unlike what is illustrated in FIG. 5, the controller 140 may directly control the switching unit 122, the audio decoding unit 123, the audio processing unit 124, the video decoding unit 125, the audio processing unit 126, the speaker 131, and the display 132.

Figure 6:
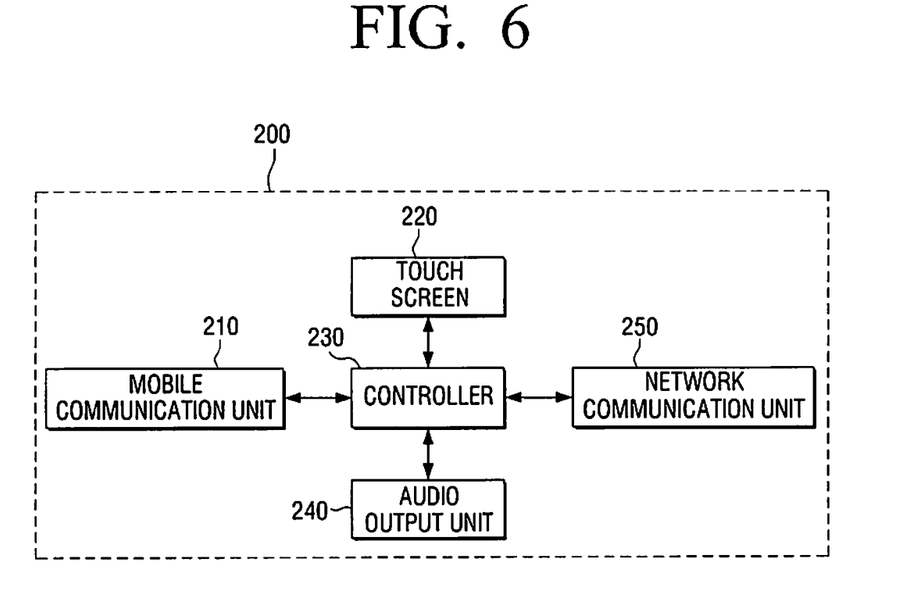
FIG. 6 is a detailed block diagram of a mobile phone constituting an audio remote output system.

FIG. 6 is a detailed block diagram of the mobile phone 200 constituting an audio remote output system. As illustrated in FIG. 6, the mobile phone 200 comprises a mobile communication unit 210, a touch screen 220, a controller 230, an audio output unit 240 and a network communication unit 250.

The mobile communication unit 210 performs original function of the mobile phone 200 such as making a mobile phone call and performing SMS function.

The touch screen 220 serves both as a display means to display a screen necessary to perform functions of the mobile communication unit 210 or the network communication unit 250 and as an input means to receive a user command through touch.

The audio output unit 240 is used to output audio data and includes an output terminal for outputting audio data through a speaker and/or a connected headphone.

The network communication unit 250 is communicably connected to the DTV 100, enabling data transmission between the DTV 100 and the mobile phone 200.

The controller 230 controls the mobile communication unit 210, the touch screen 220, the audio output unit 240, and the network communication unit 250 to perform operations of the mobile phone 200 from among operations illustrated in FIGS. 1 to 4.

To do so, the controller 230 controls to decode (decompress) compressed audio data received through the network communication unit 250 and output the decoded audio data through the audio output unit 240. In addition, the controller 230 decodes (decompresses) video data received through the network communication unit 250 and outputs the decoded video data through the touch screen 220.

The controller 230 controls to output caption data received through the network communication unit 250 through the touch screen 220. In addition, the controller 230 may execute an electronic dictionary function and display the execution result on the touch screen 220.

In addition, the controller 230 may control the network communication unit 250 to calculate a time when decoding of received audio data is completed considering a time when transmission of audio data transmitted from the DTV 100 starts, and transmit the calculated time of completion of decoding to the DTV 100.

Since decoding of audio data and video data may require a considerable amount of work, a module for decoding audio data may be formed separately.

Meanwhile, the mobile phone 200 may further includes a storage unit (not shown) which stores an electronic dictionary program or various broadcast content.

In the above embodiments, a system for remotely outputting audio includes only one mobile phone 200, but this is only an example. The technical feature of the present invention may be applied when there are a plurality of mobile phones 200.

If there are a plurality of mobile phones 200, it is required that one of the plurality of mobile phones is selected to set a communication connection in step S330 of FIG. 1, step S430 of FIG. 2, step S530 of FIG. 3 and step S630 of FIG. 4.

In the above embodiments, a system for remotely outputting audio is consisted of the DTV 100 and the mobile phone 200, but this is only an example. The technical feature of the present invention may be applied when the system for remotely outputting audio is consisted of other digital apparatuses.

That is, the DTV 100 may be a display apparatus which outputs audio to an external apparatus remotely, and the mobile phone 200 may be various types of apparatus which outputs audio. Therefore, the DTV 100 and the mobile phone 200 may be replaced with other digital apparatuses.

For example, the mobile phone 200 may be replaced with a headset. In this case, the headset may include an earphone for communicating with the DTV 100 or may have a Bluetooth® function.

The system for remotely outputting audio may be configured to further include a headset which is connected to the mobile phone 200 via wire or wirelessly, in addition to the DTV 100 and the mobile phone 200. In this case, the above-described operations of the mobile phone 200 may be performed by the headset.

Likewise, it is required that a digital apparatus for remotely outputting audio is selected to set communication connection in step S330 of FIG. 1, step S430 of FIG. 2, step S530 of FIG. 3 and step S630 of FIG. 4. FIG. 7A illustrates an example of a GUI for selecting an apparatus for remotely outputting audio, and FIG. 7B illustrates an example of a GUI for selecting an apparatus for outputting multiple audio remotely.

When the DTV 100 transmits audio data and caption data to the mobile phone 200, it is possible to trans-code the audio data and the caption data to a format supported by the mobile phone 200 and transmit the trans-coded data.

To do so, the DTV 100 may identify the format of audio data which can be supported by the mobile phone 200 (that is, the format which can be decoded) and perform trans-coding before transmitting the audio data.

When audio is remotely output from the mobile phone 200, the DTV 100 may delay outputting video to compensate non-synchronization between the video output from the DTV 100 and the audio output from the mobile phone 200 due to the time required for transmitting the audio data to the mobile phone 200 and the time required for decoding and outputting the audio data in the mobile phone 200.

Specifically, the network communication unit 250 of the mobile phone 200 receives information regarding a time when transmission of compressed audio data starts from the DTV 100. Subsequently, the controller 230 of the mobile phone 200 calculates a time of completion of decoding considering the time when transmission of the audio data starts, and the network communication unit 250 of the mobile phone 200 may transmit the calculated time of completion of decoding to an external apparatus, that is, the DTV 100.

As a result, the DTV 100 may delay outputting video using information regarding the time when transmission of compressed audio data starts and the time when decoding is completed. Accordingly, even if audio is remotely output from the mobile phone 200, the video output from the DTV 100 may be synchronized with the audio output from the mobile phone 200 may be synchronized.

The time of delaying outputting video may be manually set by a user or may be automatically calculated by the DTV 100.

The language of audio data to be output remotely from the mobile phone 200 may be selected by a user using a GUI provided by the DTV 100 or the mobile phone 200.

If the language is selected by the DTV 100, the DTV 100 transmits audio data in a language selected by a user to the mobile phone 200. However, if the language is selected by the mobile phone 200, the mobile phone 200 requests the DTV 100 for audio data in a language selected by a user, and the DTV 100 transmits the audio data in the language requested by the mobile phone 200 to the mobile phone 200.

While the present invention has been shown and described with reference to certain embodiments thereof, it will be appreciated by those skilled in the art that changes may be made in these embodiments without departing from the principles and spirit of the invention, the scope of which is defined in the appended claims and their equivalents.

What is claimed is:

1. A method for remotely outputting audio in a display apparatus, the method comprising:
   receiving broadcast content of the Audio/Visual (AV) data, over a first channel, comprising compressed video data and compressed audio data;
   decoding the AV data and outputting decompressed video data and decompressed audio data;
   receiving a command from a user to remotely output audio while the AV data is being output;
   stopping outputting decompressed audio data of the AV data and transmitting the compressed audio data and subtitle data relating to the compressed audio data to an external apparatus based on the command while the decompressed video data of the AV data over the first channel is being output at the display apparatus,
   wherein the subtitle data is displayed at the display apparatus while the subtitle data is being transmitted to the external apparatus, and wherein the AV data includes bilingual broadcast content, and the audio data is first audio data separated from bilingual audio data included in the AV data;
   displaying the subtitle data at the external apparatus; and
   further comprising:
   executing an electronic dictionary function at the external apparatus in response to an input command from the user which provides the electronic dictionary to the user; and
   looking up a meaning of a word from the displayed subtitle data at the external apparatus based on the electronic dictionary.

2. The method as claimed in claim 1, wherein the external apparatus decompresses the received compressed audio data to decode the audio data, and outputs the decoded data.

3. The method as claimed in claim 1, wherein the subtitle data is data obtained from the AV data.

4. The method as claimed in claim 1, wherein the external apparatus is a headset.

5. A method for outputting audio in a mobile apparatus, the method comprising:
   receiving audio data of broadcast content of Audio/Visual (AV) data, over a first channel, comprising compressed video data and compressed audio data from an external apparatus;
   decoding the AV data and outputting decompressed video data and decompressed audio data,
   wherein the external apparatus stops outputting decompressed audio data of the AV data and transmits the compressed audio data and subtitle data describing content of the compressed audio data to the mobile apparatus based on a command from a user to remotely output audio that is received while the AV data is being output, while the decompressed video data of the AV data over the first channel is being output at the external device,
   wherein the subtitle data is displayed at the external device while the subtitle data is being transmitted to the mobile apparatus; and
   wherein the AV data includes bilingual broadcast content, and wherein the audio data is first audio data separated from bilingual audio data included in the AV data; and further comprising:
displaying the text data on a display;
executing an electronic dictionary function at the external device in response to an input command from the user which provides the electronic dictionary to the user; and
looking up a meaning of a word from the displayed subtitle data at the external device based on the electronic dictionary.

6. The method as claimed in claim 5, wherein the other content are one of video content, text content, and video content separated from the AV content, and
wherein the video content and video content separated from the AV content are not video data of the audio data.

7. The method as claimed in claim 5, further comprising:
receiving text data describing content of the audio data; and
displaying the text data on a display.

8. The method as claimed in claim 7, further comprising:
providing an electronic dictionary to search for a word included in the text data which is displayed on the display.

9. The method as claimed in claim 5, wherein the other content is pre-stored content.

10. The method as claimed in claim 5, wherein the external apparatus is a headset.

11. A display apparatus, comprising:
a receiver configured to receive broadcast content of Audio/Visual (AV) data, over a first channel, comprising compressed video data and compressed audio data;
a separating apparatus configured to separate the AV data into the compressed audio data and the compressed video data;
a communication apparatus configured to communicate with an external apparatus;
an AV apparatus configured to decode the AV data and output decompressed video data and decompressed audio data output audio of the AV data;
a switch configured to stop the AV apparatus from outputting the decompressed audio data of the AV data and to switch the communication apparatus to transmit the compressed audio data and subtitle data describing content of the compressed audio data, to the external apparatus based on a command from a user to remotely output audio while the AV data is being output by the AV apparatus, while the decompressed video data of the AV data over the first channel is being output at the external apparatus,
wherein the subtitle data is displayed at the display apparatus while the subtitle data is being transmitted to the external apparatus; and
a processor configured to control the communication apparatus to display the subtitle data at the external apparatus,
wherein the AV data includes bilingual broadcast content, and the audio data is first audio data separated from bilingual audio data included in the AV data, and
wherein the processor is further configured to:
execute an electronic dictionary function at the external apparatus in response to an input command from the user which provides the electronic dictionary to the user; and
look up a meaning of a word from the displayed subtitle data at the external apparatus based on the electronic dictionary.

12. The display apparatus as claimed in claim 11, wherein the external apparatus receives the compressed audio data, decompresses the received compressed audio data by decoding the audio data, and outputs the decompressed audio data.

13. The display apparatus as claimed in claim 11, further comprising a processor configured to control the communication apparatus to transmit text data describing the content of the audio data to the external apparatus.

14. The display apparatus as claimed in claim 13, wherein the text data is data obtained from the AV data.

15. A mobile apparatus, comprising:
a network communication apparatus configured to receive, from an external apparatus, one of audio data of broadcast content of Audio/Visual (AV) data, over a first channel, comprising compressed video data and compressed audio data and information regarding a time when transmission of the compressed audio data starts;
a processor configured to decompress received compressed audio data by decoding the audio data;
an audio output apparatus configured to output the decompressed audio data,
wherein the external apparatus stops outputting decompressed audio data of the AV data and transmits the compressed audio data and subtitle data describing content of the compressed audio data to the mobile based on a command from a user to remotely output audio that is received while the AV data is being output, while decompressed video data of the AV data over the first channel is being output at a display apparatus, and
wherein the subtitle data is displayed at the external apparatus while the subtitle data is being transmitted to the mobile apparatus; and
a display configured to output other content of the audio data, and
wherein the AV data includes bilingual broadcast content,
wherein the audio data is first audio data separated from bilingual audio data included in the AV data,
wherein the touch screen displays the text data, and
wherein the processor is further configured to execute an electronic dictionary function at the external apparatus in response to an input command from the user which provides the electronic dictionary to the user and look up a meaning of a word from the displayed subtitle data at the external apparatus based on the electronic dictionary.

16. The mobile apparatus as claimed in claim 15, wherein the other content are one of video content, text content, and video content separated from the AV content, and
wherein the video content and video content separated from the AV content are not video data of the audio data.

17. The mobile apparatus as claimed in claim 15, wherein the network communication apparatus receives text data describing the content of the audio data, and
wherein the touch screen displays the text data.

18. The mobile apparatus as claimed in claim 17, wherein the processor executes and provides an electronic dictionary to search for a word included in the text data which is displayed on the touch screen.

19. The mobile apparatus as claimed in claim 15, wherein the other content is pre-stored content.

20. The mobile apparatus as claimed in claim 15, wherein the mobile apparatus is a headset.

* * * * *